J. A. WARRICK.
PIPE HANGER.
APPLICATION FILED MAY 8, 1911.
1,011,294.
Patented Dec. 12, 1911.
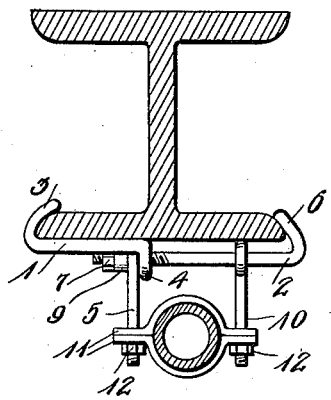
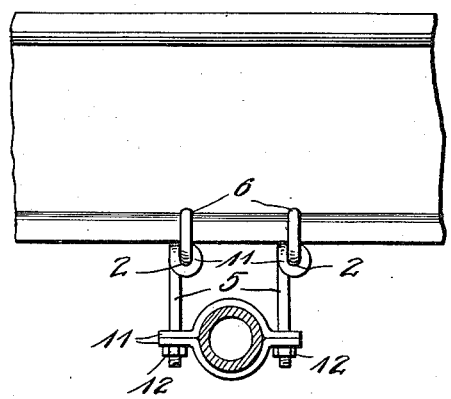
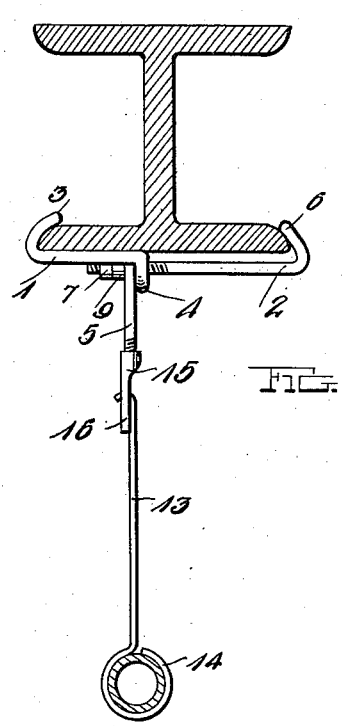
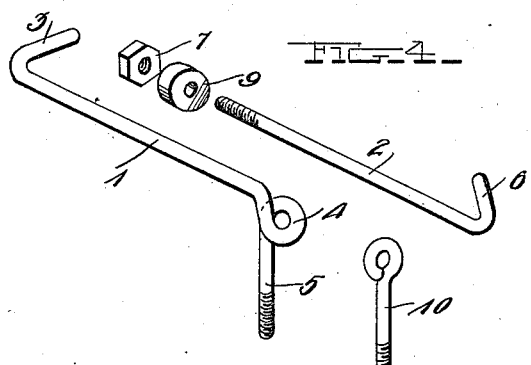
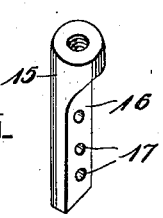
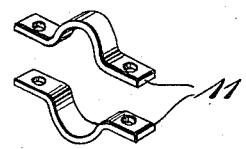
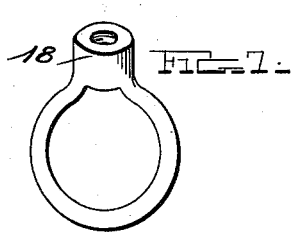
Witnesses
D. R. Price
O. B. Hopkins
Inventor
J. A. Warrick.
by H. B. Willson & Co.
Attorneys

UNITED STATES PATENT OFFICE.

JOHN A. WARRICK, OF CHICAGO, ILLINOIS.

PIPE-HANGER.

1,011,294.      Specification of Letters Patent.      Patented Dec. 12, 1911.

Application filed May 8, 1911. Serial No. 625,707.

*To all whom it may concern:*

Be it known that I, JOHN A. WARRICK, a citizen of the United States, residing at Chicago, in the county of Cook and State of Illinois, have invented certain new and useful Improvements in Pipe-Hangers; and I do declare the following to be a full, clear, and exact description of the invention, such as will enable others skilled in the art to which it appertains to make and use the same.

This invention relates to improvements in pipe hangers.

One object of the invention is to provide a pipe hanger having means whereby the same is clamped into operative engagement with an I beam or similar support.

Another object is to provide a hanger of this character adapted to be arranged for hanging pipes running parallel with or at right angles to the beams or other supports.

A further object is to provide a pipe hanger which will be simple, strong, durable, and inexpensive in construction, efficient and reliable in operation, and which may be extended to support a pipe at any desired distance below the beam.

With these and other objects in view, the invention consists of certain novel features of construction, combination and arrangement of parts as will be more fully described and claimed.

In the accompanying drawings: Figure 1 is a cross sectional view through an I beam showing the invention applied thereto for supporting a pipe running in the same direction as the beam; Fig. 2 is a side view of a portion of a beam showing the arrangement of the hangers for supporting a pipe running at right angles to the beam; Fig. 3 is a view similar to Fig. 1 showing the hanger extended to support a pipe some distance below the beam; Fig. 4 is a perspective view showing the parts of the hanger separated and in approximately the same positions they occupy when assembled; Fig. 5 is a perspective view of the extension attaching nut; Fig. 6 is a similar view of one pair of the pipe engaging straps of the hanger; Fig. 7 is a similar view of an eye nut which may be employed in connection with the beam clamping members for supporting a pipe.

My improved hanger comprises a pair of beam clamping members 1 and 2. The member 1 is in the form of a rod bent at one end to form a hook 3 and near its opposite end to form an eye 4. After forming the eye 4, this end of the rod is bent downwardly to form a supporting member 5 and is threaded to receive nuts of various kinds which will be hereinafter more fully described. The clamping member 2 comprises a rod bent at one end to form a hook 6 while the opposite end is threaded and adapted to receive a clamping nut 7.

In arranging the parts of the clamp as herein shown and described the threaded end of the member 2 is inserted through the eye in the member 1 below the I beam, and has screwed thereon the clamping nut 7 which provides means for drawing the hooked ends of the members into tight engagement with the edges of the beam while their bodies lap below it and the eye 4 is almost below its center. On the threaded end of the member 2 between the clamping nut thereon and the eye 4 is also preferably arranged a washer 9.

Engaged with the member 2 before the same is inserted through the eye 4 is a pipe supporting member 10 in the form of an eye bolt, the eye of which is engaged with the member 2 while the downwardly extending end is threaded to receive a nut as shown. With the members 5 and 10 are engaged pipe supporting straps 11 which may be of the usual or any suitable construction and which are engaged with the upper and lower side of the pipe, as shown. The hangers when arranged in this manner are adapted to support pipes running lengthwise of or in the same direction as the beams as shown in Fig. 1 of the drawings.

When it is desired to support pipes running crosswise of the beams the member 10 is omitted and two clamps are applied to the beam at the proper distance apart to permit the straps 11 to be engaged with the members 5 of the hangers. It will be understood that suitable retaining nuts 12 are screwed onto the members 5 and 10 after the straps 11 are engaged therewith thus securing the straps in place.

In order to support a pipe at some distance below the beams I provide an extension rod 13 having on its lower end an eye or loop 14 to receive a pipe and having its upper end bent to form a hook which is engaged with an attaching nut 15 adapted to be screwed onto the threaded lower end of one of the supporting members. The nut has on its lower end an arm 16 provided with a series of holes 17 adapted to receive the hooked upper end of the extension rod whereby the same and the pipe engaged with the loop in the lower end are adjustably supported.

In connection with the hanger I may also employ a short pipe receiving member in the form of an eye nut 18 adapted to be screwed onto either or both of the members 5 or 10 to support a pipe and take the place of the straps 11 hereinbefore described.

Either of the devices 15 or 18 last above described may obviously be used in place of the nut 12 at the lower end of either of the supporting members 5 or 10, and when employed in conjunction with the straps 11 supporting one pipe, another pipe can be supported within the eye 14 or the eye portion of the member 18.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

Having thus described my invention, what I claim is:

1. In a pipe hanger, a pair of beam-clamping members in the form of rods, one having a hook at one extremity, a straight body, an eye at about the center of its length standing in a plane at right angles to the length of said body, and a depending lower end forming a rigid supporting member and having its lower extremity threaded, and the other having a hook at one extremity, a straight body adapted to pass loosely beneath the beam, and threads at its other extremity; combined with a nut on these threads for drawing the members together, and object-engaging devices carried by the threaded lower extremity of the supporting member.

2. In a pipe hanger, a pair of clamping members one of which is adjustably engaged with the other, means on said members to grip a support, a stationary pipe supporting member formed on one of said clamping members, a detachable pipe supporting member engaged with the other clamping member, and pipe receiving devices adapted to be engaged with said supporting members to receive a pipe running parallel or in line with the support.

3. In a pipe hanger, a pair of beam clamping members, said members comprising rods having on one end beam engaging hooks, one of said members being bent to form a downwardly extended threaded stationary pipe supporting member, and an eye adapted to receive the inner threaded end of the opposing clamping member, a clamping nut and washer engaged with said threaded end of the opposing clamping member, whereby said members are drawn into clamping engagement with the beam, a loose pipe supporting member comprising an eye bolt adapted to be engaged with said opposing clamping member, said supporting member extending downwardly and co-acting with the stationary supporting member, and pipe receiving straps removably engaged with said supporting members.

In testimony whereof I have hereunto set my hand in presence of two subscribing witnesses.

JOHN A. WARRICK.

Witnesses:
  SAM G. MERSEN,
  G. LLOYD.